INVENTOR.
Adolphe Peterson.

Oct. 11, 1960 A. C. PETERSON 2,955,657
TURBINE AND ROTOR ARRANGEMENT AND DRIVE MEANS
Filed Jan. 31, 1956 3 Sheets-Sheet 2
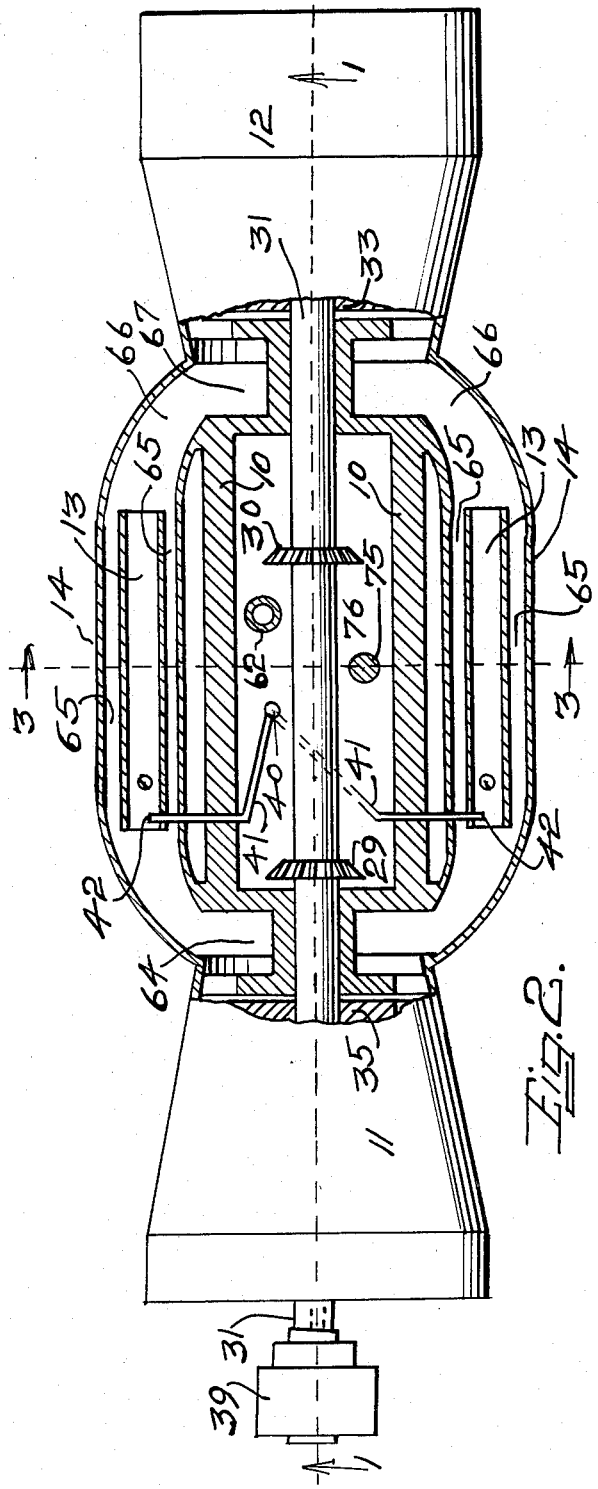
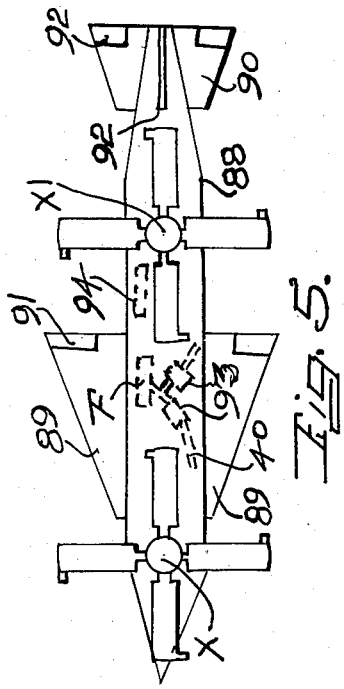
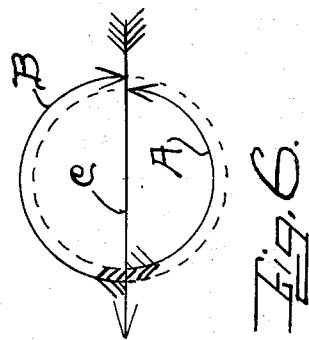
INVENTOR.
Adolphe Peterson.

Oct. 11, 1960　　　　A. C. PETERSON　　　　2,955,657

TURBINE AND ROTOR ARRANGEMENT AND DRIVE MEANS
Filed Jan. 31, 1956　　　　　　　　　　　　3 Sheets-Sheet 3

INVENTOR.
Adolph C. Peterson.

United States Patent Office 2,955,657
Patented Oct. 11, 1960

2,955,657

TURBINE AND ROTOR ARRANGEMENT AND DRIVE MEANS

Adolphe C. Peterson, 4623 Bruce Ave. S., Minneapolis, Minn.

Filed Jan. 31, 1956, Ser. No. 562,623

8 Claims. (Cl. 170—135.28)

My invention relates to the use of turbines in connection with rotors such as, helicopter rotors, and especially to a driving arrangement and a turbine arrangement in such means, and it is therefore called—Turbine and Rotor Arrangement and Drive Means.

The principal devices and combinations of devices, forming my invention, are as hereinafter defined and described. The principal objects of my invention are: to provide a form of turbine and rotor arrangement which results in an efficient drive between a turbine and a pair of rotors each of which has airfoil blades, and which results also in a construction which may be manufactured at considerably less cost in proportion to power output, than is ordinarily the case in rotor driving means. The combination of a combustion gas turbine with rotors is generally a more efficient power means for rotors than other means, but the combination of such means with rotors, especially of the helicopter type, is usually accomplished with a considerable complication in the drive means, and it is an object to effect such a combination, especially with a pair of counter rotating rotors, by a means which does not require such complicated means and which places the turbine drive means in such close and balanced relation with the rotor means, that the entire arrangement becomes an efficient system, a less costly system, and a more easily maintained system. In general the object is, improvement of the turbine and rotor combination, especially for helicopter rotors. An accompanying object is, control means for the airfoil blades of helicopter rotors, so that, control of the direction of thrust for such helicopter means, having a pair of rotors in counter-rotation, is readily effected in construction and use.

In the accompanying drawings which illustrate my invention, like characters refer to like parts throughout the several views. Referring to the drawings: Figure 1 is a view chiefly in vertical cross section on a plane passing vertically through the vertical axis of a rotor means embodying my invention, some parts being in vertical side elevation, some parts being broken away.

Figure 2 is a horizontal cross section on a plane on the line 2—2 of Figures 1, 3, this view being chiefly through the turbine means and transversely of the pylon shaft, some parts being in full plan view and some parts broken away.

Figure 1:
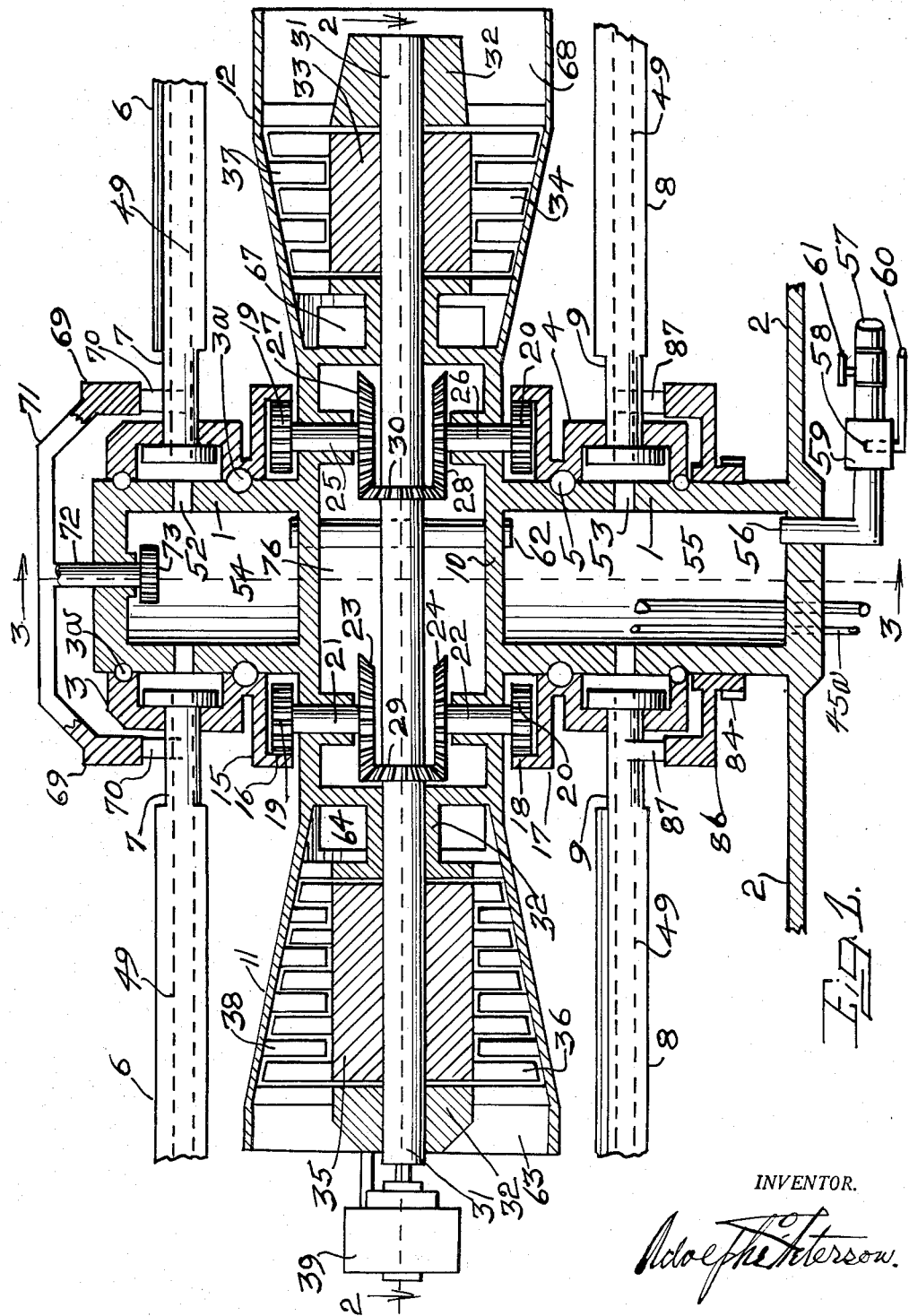
Figure 3:
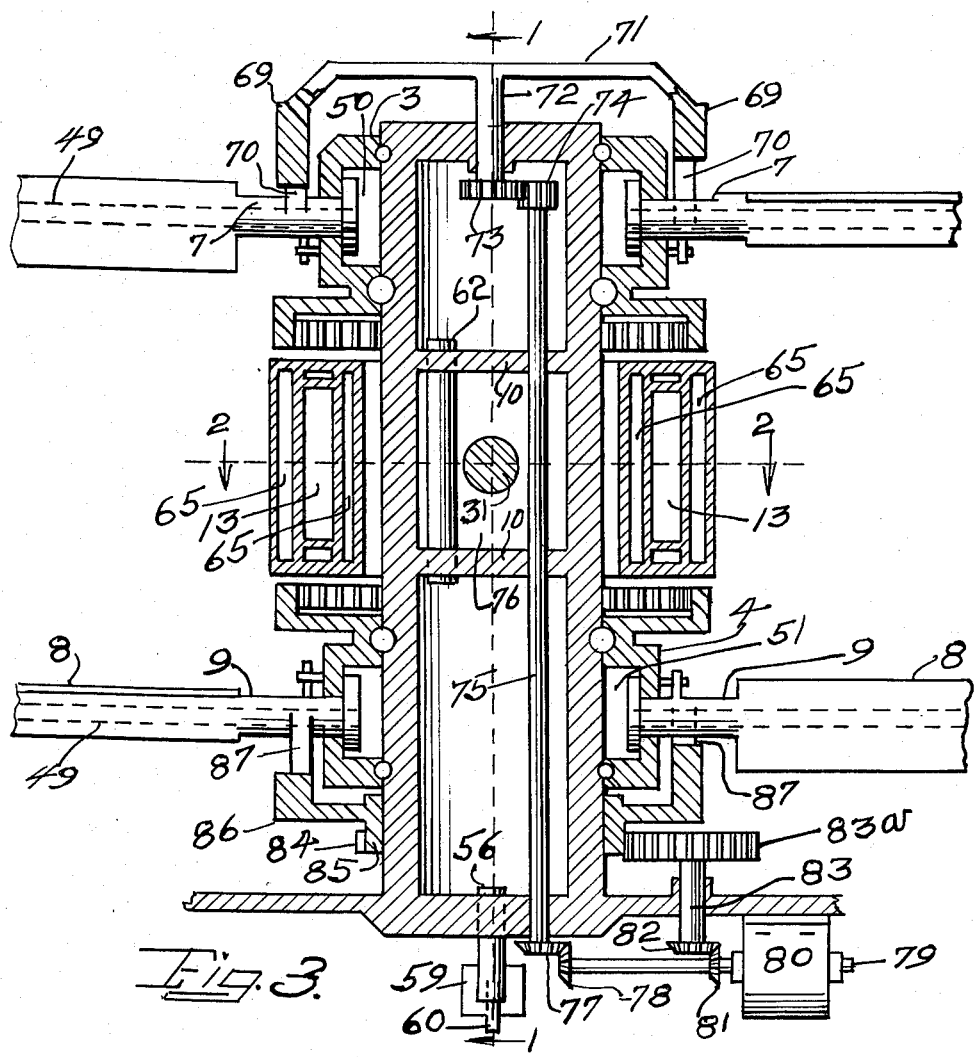
Figure 3 is a vertical section on a plane passing vertically through the vertical axis of the rotor pylon shaft, this section being at right angles to the plane of Figure 1, some parts in vertical side elevation and some parts broken away, the section being on lines 3—3 of Figures 1 and 2.
Figure 4:
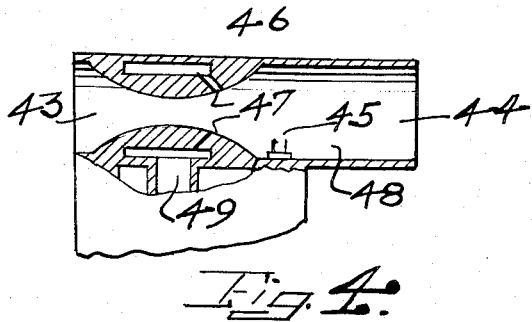

Figure 4 is a detail horizontal section through the axis of one of the ram-jet means or athodyds used on the rotor blades. Figure 5 shows diagrammatically the mounting of two such rotor systems, as my system, on an aircraft fuselage. Figure 6 is a diagrammatic sketch showing the cyclic incidence actuation of blades and the direction of thrust of such means. Figure 5 is on a very small scale in proportion to that of the other figures. Figure 1, the section, is on the line 1—1 of Figures 2 and 3.

Referring to Figures 1, 2, 3, the device comprises: a rotor pylon shaft 1, chiefly tubular in form, which is formed as a part of or fixed in any manner upon some part 2 of the fuselage frame structure or wing structure of an aircraft on which the device will be used; an upper rotor hub 3 rotatively mounted by ball or other bearing means 3a on the pylon shaft 1; a lower rotor hub 4 rotatively mounted by ball or other bearing means 5 on the pylon shaft 1; airfoil blades 6 mounted by their axle shafts 7 oscillatively in the rotor hub 3, and blades 8 mounted by their axle shafts 9 in the rotor hub 4 to be oscillative therein; a gear casing 10 which is formed or securely mounted in any manner with and as a part of the rotor pylon shaft 1, intermediately of the bearing means for the upper and lower rotor hubs; a compressor casing 11 which is formed with or securely mounted with the gear casing 10 and extends from one side of the gear casing 10 with its axis at right angles to the axis of pylon shaft 1; a turbine casing 12 which is formed with or securely mounted with the gear casing 10 and extends from the opposite side of the gear casing 10 with its axis at right angles to the axis of the pylon shaft 1; combustion chambers, two in number, which are formed with the gear casing 10 or securely mounted therewith, one of these combustion chambers being formed laterally away from and on one side of the gear casing, the other combustion chamber being formed laterally away from and on the opposite side of the gear casing 10, each being denoted 13; air jackets 14 formed, one about one combustion chamber 13 with a space between it and the combustion chamber wall, the other formed about the other combustion chamber 13 with a space between it and the combustion chamber wall. The parts named are the chief construction elements of the device. Elements 1 and 10, as a structure, is designated—static pylon structure.

The upper rotor 3 has formed with it or secured to it on its lower side and co-axially with it, a drum 15 which has an internal spur gear 16, and the lower rotor hub 4 has formed with it or secured with it on its upper side and co-axially with it, a drum 17 which has an internal spur gear 18. A pair of spur gears 19 are in engagement with the internal spur gear 16, one gear 19 being on one side of the pylon shaft 1 and the other on the other side of pylon shaft 1. A pair of spur gears 20 are in engagement with the internal spur gear 18, one gear 20 being on one side of the pylon shaft 1 and the other on the other side of the pylon shaft 1. One spur gear 19 is fixed on one end of one gear shaft 21 and one spur gear 20 is fixed on one gear shaft 22, one of these shafts having a bevel gear 23 fixed on its opposite end and the other of these shafts, 21—22, having a bevel gear 24 fixed on its opposite end. One spur gear 19 is fixed on one gear shaft 25 and one spur gear 20 is fixed on one gear shaft 26, one of these gear shafts 25—26, having a bevel gear 27 fixed on its opposite end and the other having a bevel gear 28 fixed on its opposite end.

The two gear shafts 21—22 are on one side of the axial center of the compressor and turbine casings, and the other gear shafts 25—26 are on the opposite side of the said axial center of the compressor and turbine casings. It will be seen, Figure 1, that bevel gears 23 and 24 are located one on one side of the axial center of the turbine casing and that bevel gears 27 and 28 are located each oppositely of the axial center of the turbine casing. The bevel gears 23 and 24 are in engagement on opposite sides of a small bevel gear 29 with that gear 29 which is intermediately of them. The bevel gears 27 and 28 are in engagement on opposite sides of a small bevel gear 30 with that gear 30 which is intermediately of them. The small bevel gears 29 and 30 are each fixed on the turbine shaft 31 which is rotatively mounted in the bearings 32, which are formed with or secured in the gear casing 10 and the compressor and turbine casings. The turbine shaft 31 is shown as being one integrally formed shaft, but it may be formed of any number of parts, and it is so mounted that its axis of rotation is at right angles to the axis of pylon shaft 1 and extends transversely of that axis of pylon shaft 1 and through the gear casing 10. The turbine shaft 31 has fixed on it at one end, within turbine casing 12, the turbine rotor 33 which has turbine rotor blades 34; and the turbine shaft 31 has fixed on its opposite end and on the opposite side of the pylon shaft 1, the compressor rotor 35 which has the compressor blades 36 fixed on it. The turbine casing has within it the turbine stator blades 37 and the compressor casing has within it the compressor stator blades 38, and all of these blades of compressor and turbine are as such blades are in turbines generally and operate as such.

The turbine shaft 31, at one end has associated with it, a starting motor means 39, which means may be of an electric type or any other type of motor means, and may be geared to be in engagement with the turbine shaft 31 for giving the latter the necessary initial rotation, for starting its operation, such means being well known and therefore being shown only diagrammatically. The combustion chambers 13 are each supplied with fuel for combustion by any means supplying fuel, preferably liquid fuel, through the common supply pipe 40 to the branch fuel pipes 41, one for each combustion chamber 13. It is contemplated that fuel may be supplied to the fuel branch pipes 41 and the fuel nozzles 42, at any predetermined pressure which will adequately supply the fuel for combustion and that this fuel supply may be supplied by any fuel supply means, such as a pump and reservoir, designated generally as F and located any place in an aircraft fuselage or structure and controlled generally as such means commonly are in association with turbines, or by any control means for the purpose.

Each airfoil blade of each of the rotors has fixed upon its extreme radially outward end, a ram-jet, or athodyd, such as is shown in Figure 4, and this has the air induction mouth 43 at its forward end, the jet exhaust 44 at its rearward end, the ignition means 45, an annularly formed fuel or carburetted air channel 46, fuel jets 47 discharging therefrom to the combustion space 48, and the associated fuel or carburetted air conduit 49 passing to the channel 46 and from the spaces 50, within one rotor hub, and 51, within the other rotor hub, which annular spaces 50, 51, are supplied with the fuel or carburetted air through passages 52, 53, from the compartments 54 and 55, respectively, which compartments are formed within the pylon shaft 1. Carburetted air is supplied to the compartments 54, 55, from a mixture pipe 56, the latter receiving air under any small or requisite pressure from air pipe 57, this air being carburetted by fuel from fuel nozzle 58 in carburettor 59, from the fuel supply 60, a valve 61 interposed in air pipe 57 providing for control of this air flow. The carburetted air supply may pass from the one compartment 55 to the compartment 54 by way of the transfer pipe 62. Conduits 45a provide current.

The compressor casing inducts atmospheric air by its forward open end 63 and the air compressor discharges air under a pressure of say 50 to 100 pounds, more or less, to the annular space 64 adjacent the high pressure end of the compressor casing, and this space 64 discharges the compressed air in two streams for combustion, through the combustion chambers 13, and discharges cooling air streams through the air passages 65, and after combustion occurs in the chambers 13, the gases mix with air in the passage 66 and annular space 67 at the high pressure end of the turbine casing, and the gases from the space 67 pass through the turbine casing to drive the blades 34 of the turbine and the turbine rotor 33 and thereby drive the smaller bevel gears 29 and 30, and by the transmission means as described, the two rotor hubs are rotated, one in one direction, one in the other or opposite direction of rotation. The gases of combustion discharge through the jet discharge tube 68, and the latter is of any suitable length to most effectively make use of the residual energy in the gases, for the horizontal forward propulsion of the unit by the reaction from the discharging gases.

The upper rotor hub 3, has in association with it, a cam-plate 69 which is annular in form and placed above the cam-contacting elements 70, one fixed on each blade axle shaft 7 of the upper rotor hub, and this cam-plate 69 is fixed to arms 71, above pylon shaft 1, the arms 71 being formed with or fixed to a cam-shaft 72 which latter is mounted rotatively in the axial center of the pylon shaft 1, within the wall of shaft 1, in which it is rotatable as a bearing, and this cam-shaft 72 on its lower end has fixed on it the small spur gear 73 which is in engagement with spur gear 74 on the upper end of a shaft 75, the latter being offset from the axis of pylon shaft 1, and being passed downwardly through the gear compartment 76 and the other compartments of shaft 1, to a location below the lower end of pylon shaft 1, where there is fixed on it a bevel gear 77, the latter being in engagement with bevel gear 78 which is on armature shaft 79 of electric motor 80 which is an adjusting motor means or control motor. The armature shaft 79 has also bevel gear 81 in engagement with bevel gear 82 on shaft 83 which has small spur gear 83a in engagement with larger spur gear 84 which is formed on the lower end of the sleeve 85 (rotatable on the exterior surface of pylon shaft 1 as a bearing), and the sleeve 85 is formed with the cam-plate 86 whose upper cam surface is in sliding engagement with the cam-contacting elements 87 to engage these as they may slide over the cam surface, the cam-contacting elements 87 being each formed with one axle shaft 9 of one of the blades 8 of the rotor hub 4.

The association of the gear means for adjusting the cam-plates, rotatably about the pylon shaft 1, is such that when adjusted by the motor 80, the cam-plates will rotate in the same rotative direction about the axis of pylon shaft 1, and is such that this rotation will be equal in extent, so that each cam-plate may be adjusted by rotation in exactly equal extent, either way or in rotation, about the axis of the pylon shaft 1 and always in the same direction, thus procuring the change in the direction of propulsive thrust from the two rotors, in the horizontal direction. The cam-plates, as will be seen in Figures 1 and 3, have their cam surfaces, the lower surface as on the upper rotor hub, and the upper surface, as on the lower rotor hub, at such angles in rotation, to the plane of rotation of the rotor hubs, that the airfoil blades of the one rotor hub will have their deeper phases of air incidence at a side of the axis of the pylon shaft 1, which is opposite to that of the other rotor hub. Thus the blades of one rotor hub will give increased backward thrust at one side, and the blades of the other rotor hub, at the other side of the axis of the pylon shaft 1, and that backward thrust will always be in the same direction. I have shown no means for increasing the relative changes of pitch or decreasing such relative changes of pitch, it being contemplated that any such means may be incorporated with the device, if that be desired, since such means are well known. Changes of thrust for vertical sustentation, and for horizontal propulsion thrust, may be made by change and control of the power output of the turbine means, which has been described.

Referring to Figure 5, it may be seen that two such rotor means, each having the two rotor hubs 3 and 4 and their associated airfoil blades and turbine drive means, are mounted on the aircraft fuselage 88, one in a forward location, and the other in a rearward location, on the upper side of the fuselage. This fuselage may have swept wing or delta wings 89 and 90, and such control ailerons 91 and rudder means 92, as is desired, in any construction. The fuselage 88 may have in it the fuel supply and control means F for the turbines, each having an independently regulatable control valve means 93, so that each turbine may be independently controlled, if desired. The fuselage 88 has also located in it, the air pressure supply unit 94 which may be any such means, as a turbine and compressor. Any of the valve means may have any type of remote control means, such as is well known.

In the use of my rotor means or units, such means in an aircraft may each be separately controlled as to its operation, or they may be controlled in unison by any means for that purpose. The turbine means operates by induction of air and compression of air in the compressor casing, by the compressor rotor; and that air is, after compression, fed with fuel, as described, and combustion occurs in the two combustion chambers on opposite sides of the pylon shaft 1, and that combustion produces gases which pass together through the turbine casing to drive the turbine. When so driven the turbine shaft rotates the transmission means to drive one rotor hub in one direction and the other rotor hub in the counter direction of rotation. The pilot may at any time give additional driving power to the rotor means, by causing the air and fuel supply means in the fuselage to supply a richly carburetted air through the carburetted air pipe 56 to the compartments 54 and 55 from whence that carburetted air passes through the conduits 49 of the blades, to the ram-jets or athodyds, at the ends of the blades, and combustion there may ensue to increase driving force on the rotor hubs and their blades. Such ram-jet driving force, may be used only for climbing, hovering or descending, or at times when unusual power is required, or it may be continuously used, according to the desired construction and use.

The pilot may adjust the propulsive direction of horizontal or translational thrust by control of motor 80 to drive it in either direction, it being a reversible motor, and by this means he may change the direction of propulsive thrust from the rotor, the dual rotor means, as he may desire. In Figure 6, arrow A shows the direction of deepened pitch thrust for one rotor hub and arrow B, for the other rotor hub of one unit, and arrow C shows the resultant direction of propulsive thrust for the unit as an entirety. Referring to Figure 5, the direction of horizontal propulsive thrust of the units X and X1, may be in the same direction, which will give forward translational propulsion or travel, and as an alternative the pilot may change the direction of thrust of one unit X or X1 to give opposite horizontal propulsion, and in the latter case, the horizontal travel thrust will be neutralized, and hovering or slow descent may be caused.

In the change of direction of propulsive thrust, horizontally, by means of the electric motor 80, the adjusting action through the gears associated with the motor 80 and the cyclic pitch change means, is such, that the cam-plates, otherwise called wabble-plates, when turned about their axes, will turn in the same direction and exactly equal degree, so that the relative positions of the cam-plates, each to the other, remains unchanged, and their deepened pitch phases remain unchanged relatively each to the other, but is such that the relative positions of the two cam-plates or wabble plates, as a unit, relatively to the rotor pylon shaft 1, does change, and this last named change relatively to the pylon shaft causes the change of the resultant propulsive thrust horizontally of the unit as an entirety. In any change of this direction of propulsive thrust, horizontally, the relative vertical thrust or lift of the rotor unit, as an entirety, remains the same in direction and in force of the vertical lift thrust, so that thus such lift ability is unimpaired by the change of horizontal propulsive direction. This enables neutralization or near neutralization of horizontal thrust by the use of two or more such units, as may be desired, on an aircraft, and as is shown in Figure 5. The turbine power means of the units is preferably so constructed that a proportionately large proportion of the power will be utilized for the driving of the rotor hubs through the gear transmission means, so that the jet exhaust does not have more horizontal thrust than may be considered necessary for slow maneuvering. Any other known means may be used to counteract this turbine jet thrust. The ram-jet propulsion of the rotor hubs may be used in vertical climbing, or hovering, or descent, to supplement the power of the turbine units, and in this use, the turbine power may be lessened in its use, during such climb, descent, or hovering use. The turbine drive is contemplated to be the chief power source in horizontal travel, due to its economy. The turbine and its shaft means may be of any type such as the combination of compressor turbine with free power turbine for the rotors. It is contemplated that other devices and combinations of devices may be used in the realization of my invention, without departing from the spirit and contemplation thereof.

What I claim is:

1. In a rotor means for aircraft: a static pylon structure formed to have a first rotor bearing and a second rotor bearing and to have between said rotor bearings an affixed mounting adjacent one side of the axis of the structure for a compressor casing and to have an affixed mounting for a turbine casing adjacent another side of the axis of the structure and substantially diametrically oppositely of the compressor casing; a compressor casing affixed with said first mounting and a turbine casing affixed with said second mounting; a compressor rotor rotatably mounted in the compressor casing and a turbine rotor rotatably mounted in the turbine casing, and a connecting shaft means between the compressor rotor and the turbine rotor, the connecting shaft means and the compressor and turbine rotors having coincidental axes as extended; a combustion chamber means extended laterally of the said connecting shaft means and affixed to said pylon structure and in conductive connection between said compressor casing and said turbine casing, and means for delivery of fuel to said combustion chamber means; a first rotor hub rotatively mounted on said first rotor bearing and having airfoil blades mounted therewith to be carried therewith in rotation; a second rotor hub rotatively mounted on said second rotor bearing to rotate in a plane substantially parallel to the plane of rotation of the first rotor hub and its attached airfoil blades; a gear affixed on said first rotor hub and a gear affixed on said second rotor hub, the said gears being respectively co-axial with said first and second rotor bearings; a transmission means between the said gears and said connecting shaft means; the said transmission means between the said gears and said connecting shaft means including a bevel gear on said connecting shaft means, a pair of bevel gears each in actuable engagement with the first named bevel gear and one of said pair of bevel gears on one side and the other on a diametrically opposite side, each of said pair of bevel gears being fixed on shafts rotatable in bearings in said pylon structure each said shaft having affixed thereto a spur gear in actuable engagement with one of said gears affixed to said rotor hubs; and means for mounting said pylon structure on an aircraft fuselage structure for support thereby of the fuselage structure.

2. The means as defined in claim 1, and: the said transmission means having arrangement and transmission actuation such that one said rotor hub and its blades are rotated in one direction and the other said rotor hub and its blades are rotated in the opposite direction; means in actuable interconnection with said blades to impart cyclic deepened pitch to the blades of each said rotor and means to adjust said last named means to change the direction of propulsion thrust in the plane transversely of the axis of rotation of the rotor hubs.

3. The means as defined in claim 1, and: the said combustion chamber means including two divisions thereof one on one lateral side of said static pylon structure spaced therefrom and one on the other side of said pylon structure spaced therefrom.

4. The means as defined in claim 1, and; a supplementary means to supply a fuel bearing fluid, ram jet means fixed on each of the air foil blades of each rotor hub, distributing means in inter-connection between said rotor hubs and said static pylon structure, means to pass said fuel bearing fluid by said distributing means to said ram-jet means for combustion with atmospheric air passing therethrough and means for ignition in said ram-jet means.

5. In a rotor means for aircraft: a static pylon structure formed to have a first rotor bearing and a second rotor bearing and to have formed therewith an intermediate casing and supporting structure including a mounting adjacent one side of the axis of the structure for a compressor casing and to have an affixed mounting for a turbine casing adjacent another side of the axis of the structure and substantially diametrically oppositely of the compressor casing; a compressor casing affixed with said first mounting and a turbine casing affixed with said second mounting; a compressor rotatably mounted in the compressor casing and a turbine rotor rotatably mounted in the turbine casing, and a connecting shaft means between the compressor rotor and the turbine rotor, the connecting shaft means and the compressor and turbine rotors having coincidental axes as extended; a combustion chamber means extended laterally of the said connecting shaft means and affixed to said pylon structure and in conductive connection between said compressor casing and said turbine casing, and means for delivery of fuel to said combustion chamber means; a first rotor hub rotatively mounted on said first rotor bearing and having airfoil blades mounted therewith to be carried therewith in rotation; a second rotor hub rotatively mounted on said second rotor bearing to rotate in a plane substantially parallel to the plane of rotation of the first rotor hub and its attached airfoil blades; a gear affixed on said first rotor hub and a gear affixed on said second rotor hub; a transmission means between the said gears and said connecting shaft means; the said gears on said rotor hubs being each an internal spur gear circumferentially of the axis of the rotor hub; the said transmission means including two external spur gears associated one with one said internal spur gear and in mesh therewith and one associated with the other said internal spur gear and in mesh therewith; and means for mounting said pylon structure on an aircraft fuselage structure for support thereby of the fuselage structure.

6. In a rotor means for aircraft: a turbine casing structure having a bearing structure therein rotatively mounting a turbine shaft means; a pair of pylon shafts mounted to have axes perpendicularly of the axis of said turbine shaft means and to be, one affixed to one side of said turbine casing structure and the other affixed on the diametrically opposite side of the turbine casing structure, a rotor bearing formed on one said pylon shaft to have its axis transversely and perpendicularly of the axis of said turbine shaft means and a rotor bearing formed on the other said pylon shaft to have its axis transversely and perpendicularly of the axis of said turbine shaft means; a rotor hub rotatively mounted on one said rotor bearing and a rotor hub rotatively mounted on the other said rotor bearing; each said rotor hub carrying mounted thereon air foil blades to be carried rotatively with the associated rotor hub, the blades of one said rotor hub being rotative in a plane parallel to the plane of rotation of the blades of the other rotor hub; a compressor rotor and a turbine rotor carried on the turbine shaft means to be rotative as a unit; a combustion chamber means formed in said turbine casing structure to have gaseous fluid flow therethrough from the compressor rotor to the turbine rotor; one said pylon shaft being extended through and from its rotor bearing and to be fixed on a fuselage structure; each rotor hub having formed therewith a gear co-axial with the associated rotor bearing, and a transmission means between each said gear and the turbine shaft means.

7. The means as defined in claim 6, and: the airfoil blades of said rotor hubs having each a ram-jet driving unit carried thereon; each said rotor hub having a port means formed therein and the associated pylon shaft having port means cooperative therewith to pass fuel fluid from a chamber means interiorly of the pylon shafts, to the ram-jet driving units of the associated rotor hub; and means delivering fuel fluid under pressure to the chamber means for such passage to the ram-jet driving units.

8. In a rotor means for aircraft, a static pylon structure formed to have a first rotor bearing and a second rotor bearing and to have formed therewith an intermediate casing and supporting structure including a mounting adjacent one side of the axis of the structure for a compressor casing and to have an affixed mounting for a turbine casing adjacent another side of the axis of the structure and substantially diametrically oppositely of the compressor casing; a compressor casing affixed with said first mounting and a turbine casing affixed with said second mounting; a compressor rotatably mounted in the compressor casing and a turbine rotor rotatably mounted in the turbine casing, and a connective shaft means between the compressor rotor and the turbine rotor, the connecting shaft means and the compressor and turbine rotors having coincidental axes as extended; a combustion chamber means extended laterally of the connecting shaft means and affixed to said pylon structure and in conductive connection between said compressor casing and said turbine casing, and means for delivery of fuel to said combustion chamber means; a first rotor hub rotative'y mounted on said first rotor bearing and having airfoil blades mounted therewith to be carried therewith in rotation; a second rotor hub rotatively mounted on said second rotor bearing to rotate in a plane substantially parallel to the plane of rotation of the first rotor hub and its attached airfoil blades; a gear affixed on said first rotor hub and a gear affixed on said second rotor hub; a transmission means between the said gears and said connecting shaft means; means for mounting said pylon structure on an aircraft fuselage structure for support thereby of the fuselage structure; the said gears being each co-axial with said first and second rotor bearings.

References Cited in the file of this patent
UNITED STATES PATENTS

| | | |
|---|---|---|
| 1,527,701 | Pescara | Feb. 24, 1925 |
| 2,472,917 | Nicolaeff | June 14, 1949 |
| 2,711,295 | Peterson | June 21, 1955 |
| 2,772,745 | Bordoni | Dec. 4, 1956 |